United States Patent [19]
Nelson

[11] Patent Number: 5,119,915
[45] Date of Patent: Jun. 9, 1992

[54] ELECTROMAGNETIC COUPLING ARMATURE ASSEMBLY WITH FLUX ISOLATOR SPRINGS

[75] Inventor: Dennis J. Nelson, Rockford, Ill.
[73] Assignee: Dana Corporation, Toledo, Ohio
[21] Appl. No.: 700,439
[22] Filed: May 15, 1991
[51] Int. Cl.$^5$ ............. F16D 27/00; F16D 3/64
[52] U.S. Cl. ................. 192/106.1; 192/84 C; 192/109 R; 335/274; 464/81; 464/100; 267/158
[58] Field of Search ......... 192/84 C, 106.1, 109 R; 188/164; 335/274; 267/158, 161, 163; 464/69, 81, 100, 160

[56] References Cited

U.S. PATENT DOCUMENTS

| | | |
|---|---|---|
| 3,044,594 | 7/1962 | Bernard ............. 192/84 C |
| 3,263,784 | 8/1966 | Pierce ............. 192/84 C X |
| 4,160,498 | 7/1979 | Newton et al. ......... 192/84 C |
| 4,187,939 | 2/1980 | Silvestrini et al. ...... 192/84 C |
| 4,278,161 | 7/1981 | Mower et al. ......... 192/84 C |
| 4,445,606 | 5/1984 | VanLaningham ....... 192/106.1 |
| 4,493,407 | 1/1985 | Newton ............. 192/84 C |
| 4,574,930 | 3/1986 | Koitabashi .......... 192/84 C |
| 4,616,742 | 10/1986 | Matsushita ......... 192/84 C |
| 5,036,964 | 8/1991 | Booth et al. ......... 192/84 C |

FOREIGN PATENT DOCUMENTS 56-134633  10/1981  Japan ............. 192/84 C

*Primary Examiner*—Richard Lorence
*Attorney, Agent, or Firm*—Leydig, Voit & Mayer

[57] ABSTRACT

An armature assembly for an electromagnetic coupling includes an armature plate made of a material having low magnetic reluctance and also includes an output hub having angularly spaced and radially extending mounting arms for supporting the armature plate. The armature plate is connected to the mounting arms by angularly spaced leaf springs which couple the armature plate and the output hub for rotation in unison while allowing the armature plate to move axially relative to the mounting arms when the coupling is engaged and disengaged. The leaf springs are made of a material having high magnetic reluctance and are formed with tabs or fingers which are sandwiched between the armature plate and the mounting arms to create a flux barrier for magnetically isolating the armature plate from the mounting arms and the output hub.

16 Claims, 2 Drawing Sheets

ELECTROMAGNETIC COUPLING ARMATURE ASSEMBLY WITH FLUX ISOLATOR SPRINGS

BACKGROUND OF THE INVENTION

This invention relates generally to an electromagnetic coupling such as a clutch or brake and, more particularly, to an armature assembly for such a coupling.

Newton U.S. Pat. No. 4,493,407 discloses a typical electromagnetic clutch in which an armature is connected to a driven hub by a mounting plate and is adapted to be frictionally coupled to a driving rotor when an electromagnet is energized to engage the clutch. Upon energization of the electromagnet, magnetic flux cuts across an air gap between the rotor and the armature and attracts the armature into engagement with the rotor. The armature is rotated by the rotor and acts through the mounting plate to rotate the driven hub.

In clutches of the type disclosed in the Newton patent, the armature is connected to the mounting plate by a series of leaf springs which couple the armature and mounting plate for rotation in unison while allowing the armature to move toward and away from the rotor when the electromagnet is energized and de-energized. Each spring usually is riveted at one end to the armature and at the other end to the mounting plate. Rubber bumpers are carried by the mounting plate and contact the armature to hold the mounting plate and the armature out of engagement with one another and thereby establish a flux barrier between the two.

Torsional shock occurs when the clutch is first engaged and torsional spikes are created during steady state operation of the clutch. In order to dampen the torsional shock and to smooth the spikes, the clutch of the Newton patent utilizes an elastomeric spider between the mounting plate and the driven hub.

A less expensive and more axially compact armature assembly makes use of a so-called ring spring between the armature and the mounting area of the driven hub. The ring spring actually is a series of three generally circular and angularly spaced leaf spring sections which, due to their shape and location, provide some limited torsional dampening. In this type of an armature assembly, separate non-magnetic bumpers or spacers also must be provided between the armature and the mounting area of the driven hub in order to isolate the armature magnetically from the hub.

SUMMARY OF THE INVENTION

The primary aim of the present invention is to provide a new and improved armature assembly in which the leaf springs themselves are uniquely constructed to isolate the armature magnetically from the driven hub in order to establish a flux barrier without need of utilizing and installing additional components such as bumpers or the like.

A more detailed object of the invention is to achieve the foregoing through the use of leaf springs made of non-magnetic material and formed with integral projecting tabs or fingers adapted to be sandwiched between the armature and the mounting area of the driven hub in order to create a flux barrier.

The invention also resides in the unique location of the tabs or fingers with respect to the main portions of the leaf springs and with respect to the mounting area of the driven hub.

These and other objects and advantages of the invention will become more apparent from the following detailed description when taken in conjunction with the accompanying drawings.

DETAILED DESCRIPTION OF THE PREFERRED EMBODIMENTS

Figure 1:
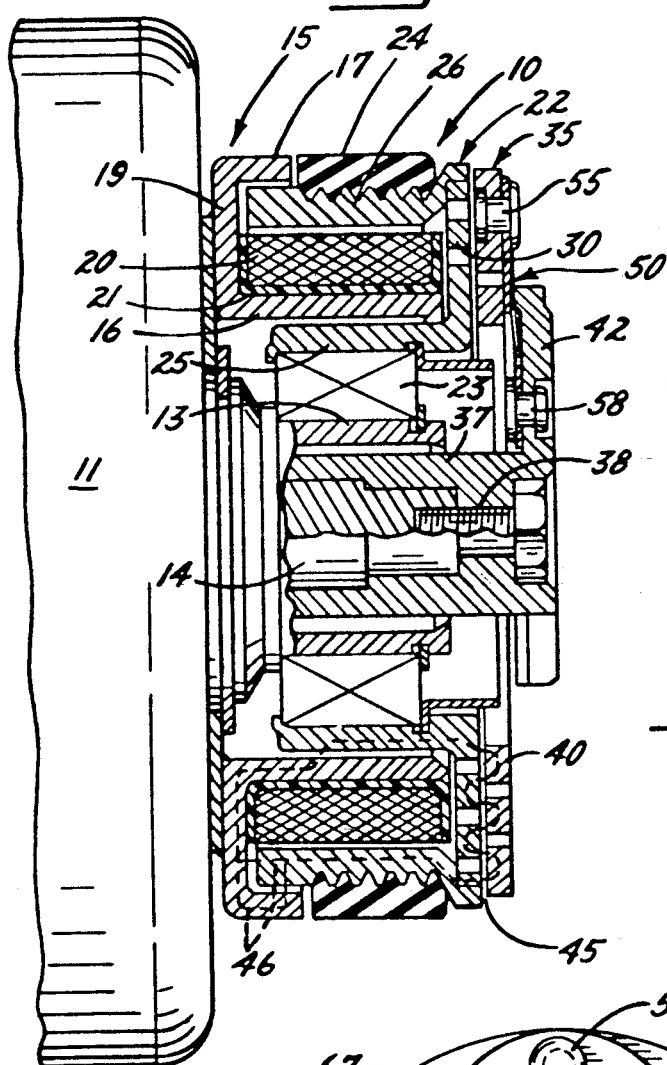
FIG. 1 is a sectional view taken axially through a typical electromagnetic coupling equipped with one embodiment of a new and improved armature assembly incorporating the unique features of the present invention.

For purposes of illustration, the present invention is shown in connection with an electromagnetic coupling 10 which could be a brake but which herein is in the form of an electromagnetic clutch. The clutch 10 is shown as being used in conjunction with an automobile air conditioning compressor 11 having a tubular nose 13 for mounting the clutch and having a drive shaft 14 which extends through the nose.

The clutch 10 includes an electromagnet which is formed in part by an annular magnet core 15 of substantially J-shaped radial cross-section and having an inner pole ring 16 and an outer pole ring 17. Formed integrally with and extending radially between the rear ends of the two pole rings is a bridge 19 which is rigidly secured to the end of the compressor 11. A multiple turn winding 20 is secured within a U-shaped channel 21 which, in turn, is fastened to the outer side of the inner pole ring 16. Reference may be made to Newton et al U.S. Pat. No. 4,160,498 for a more detailed disclosure of the magnet core 15.

An annular rotor 22 is rotatably journaled on the nose 13 of the compressor 11 by a bearing 23 and is adapted to be driven from the engine of the vehicle by an endless belt 24. The rotor is substantially U-shaped in radial cross-section and includes inner and outer concentric annular pole pieces 25 and 26 made of low reluctance material, the inner pole piece being secured to the outer race of the bearing. Several axially spaced grooves extend circumferentially around the outer side of the outer pole piece 26 and interfit with complemental ribs on the inner side of the drive belt. Accordingly, the outer pole piece defines a pulley for the belt.

The inner pole piece 25 of the rotor 22 is spaced inwardly from the inner pole ring 16 of the magnet core 15 while the outer pole piece 26 of the rotor is located between and is spaced from the winding 20 and the outer pole ring 17 of the core. When the winding 20 is excited by a voltage source, magnetic flux is produced and threads through the core and the rotor and across the various gaps between the pole rings and the pole pieces. The nature of the controlled flux transfer between the core and the rotor is explained in more detail in the aforementioned Newton et al patent.

Connected to and extending between the pole pieces 25 and 26 of the rotor 22 is an axially facing friction face 30 which is circumferentially slotted in a conventional manner so as to define multiple magnetic poles. When the winding 20 is energized, the friction face forms a rotatable magnetic field member.

Located in opposing relation to the rotor face 30 is an armature assembly 35. When the winding 20 is excited, magnetic flux draws part of the armature assembly into frictional engagement with the rotor face 30 so as to couple the armature assembly and the rotor for rotation in unison. Rotation of the armature assembly is transmitted to the shaft 14 in order to drive the compressor 11.

More specifically, the armature assembly 35 includes a tubular hub 37. The hub is telescoped over and is keyed to the compressor shaft 14 and is clamped in an axially fixed position on the shaft by a screw 38 which is threaded into the free end portion of the shaft.

The hub 37 includes areas for mounting and supporting an armature plate 40. In this particular instance, the mounting areas are defined by three angularly spaced and radially extending arms 42 (FIG. 3) which are formed integrally with the forward end portion of the hub. Thus, the forward end portion of the hub is in the form of a spider.

Herein, the armature 40 is defined by an annular disc or plate made of low magnetic reluctance material such as AISI 1010 steel capable of carrying magnetic flux. The armature plate 40 is formed with two radially spaced rows 43 and 44 (FIG. 3) of angularly spaced slots. The slots cause the armature plate to have magnetic poles which coact with the poles of the friction face 30 of the rotor 22.

As shown in FIG. 1, the armature plate 40 is disposed in axially opposed relation with the friction face 30 of the rotor 22. When the winding 20 is deenergized, the armature plate 40 is spaced from the rotor face, and an axial air gap 45 exists between the pole faces of the rotor and the pole faces of the armature plate. Upon energization of the winding, magnetic flux threading along a path 46 cuts across the air gap to draw the armature plate into frictional engagement with the rotor and thereby couple the armature plate for rotation in unison with the rotor.

The armature plate 40 is connected to the mounting arms 42 of the hub 37 by leaf spring means and specifically by angularly spaced leaf spring sections 50 (FIGS. 3 and 5) which herein are formed separately of one another. In the embodiment of the armature assembly 35 shown in FIGS. 1 to 5, there are three angularly spaced springs 50. Each spring is generally circular in shape with the radially innermost portion of the spring tapering to somewhat of a teardrop configuration. The radially innermost edge 51 (FIG. 5) of each spring is concavely radiused to accommodate the tubular portion of the hub 37. A compartively large and axially extending opening 53 is formed through the center portion of each spring to increase its flexibility and to enable the inner and outer portions of the spring to lie in different planes.

Figure 2:
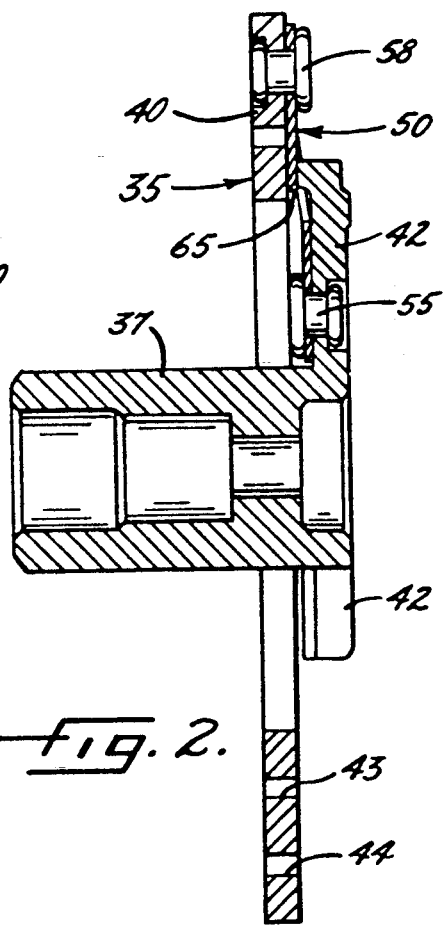
FIG. 2 is an enlarged sectional view of the armature assembly shown in FIG. 1.
Figure 3:
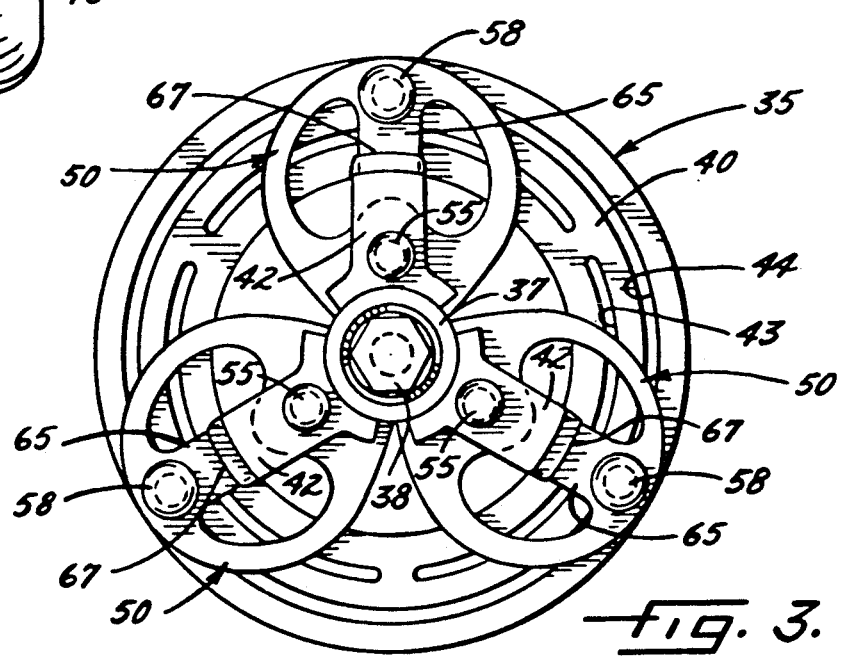
FIG. 3 is a front elevational view of the armature assembly shown in FIG. 1.
Figure 4:
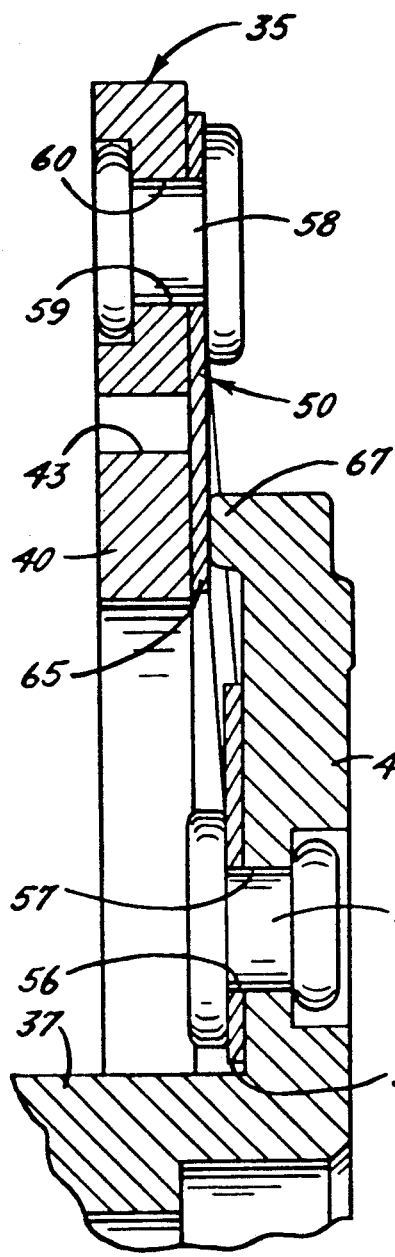
FIG. 4 is an enlarged view of certain components of the armature assembly shown in FIG. 2.

As shown in FIGS. 2 to 4, the three springs 50 are aligned angularly with the three arms 42 of the hub 37 and are interposed between the arms and the armature plate 40. The inner end portion of each spring 50 is connected to an arm 42 while the outer end portion of each spring is connected to the armature plate 40. For this purpose, an inner rivet 55 (FIG. 4) extends through a hole 56 in the inner portion of each spring and through a hole 57 in the adjacent arm 42 to clamp the spring to the arm. An outer rivet 58 extends through a hole 59 in the outer portion of each spring and through a hole 60 in the armature plate 40 to fasten the spring to the armature plate. The two rivets 55 and 58 are located along a radially extending line which bisects the arm 42 and the spring 50.

The springs 50 are deflected or biased so as to urge the armature plate 40 toward the arms 42 of the hub 37 to a normal position. In this position, the armature plate 40 is spaced axially from the face 30 of the rotor 22 and thus the clutch 10 is released. When the coil 20 is excited, the springs 50 flex to allow the magnetic flux to pull the armature plate axially across the air gap 45 and into engagement with the rotor face so as to cause the armature plate to rotate with the rotor. Rotation of the armature plate is transmitted to the mounting arms 42 by the springs 50 so as to effect rotation of the hub 37 and the compressor output shaft 14. Due to the shape and location of the springs, the springs effect some torsional dampening as torque is transmitted from the armature plate 40 to the hub 37.

Upon de-energization of the coil 20, the loaded springs 50 tend to relax and act to pull the armature plate 40 axially away from the friction face 30 of the rotor 22. The clutch thus is released to interrupt the transfer of torque to the output shaft 14.

To enable the flux to pull the armature plate 40 across a relatively wide air gap 45 and to enable the clutch 10 to develop comparatively high torque, it is necessary to establish a flux barrier between the armature plate and the mounting arms 42 of the hub 37 in order to isolate the armature plate magnetically from the mounting arms and the hub. According to the present invention, the springs 50 themselves are uniquely constructed to serve as magnetic isolators. As a result, there is no need to install separate isolator components between the armature plate and the mounting arms and thus both component costs and assembly costs are reduced.

In carrying out the invention, the springs 50 are made of a material which possesses high magnetic reluctance and which thus is resistive to the passage of magnetic flux. By way of example, the springs may be made of stainless steel.

Figure 5:
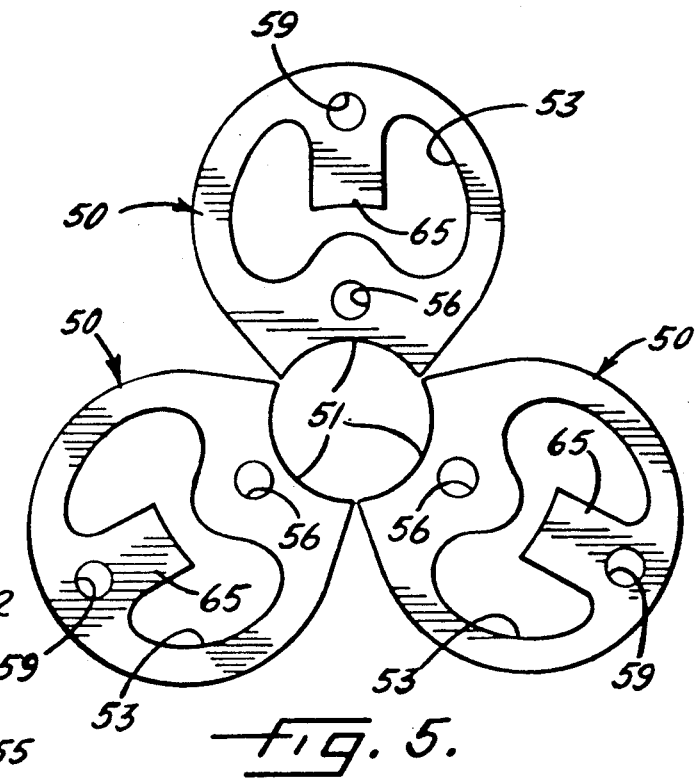
FIG. 5 is a front elevational view of the leaf springs shown in FIG. 3.

To establish a flux barrier between the armature plate 40 and the mounting arms 42, each spring 50 is formed with a short tab 65 (FIGS. 3 to 5). In the embodiment of FIGS. 1 to 5, each tab 65 extends radially into the opening 53 through the spring 50 and is aligned angularly with the associated mounting arm 42 and rivets 55 and 58 so as to extend radially with respect to the mounting arm. Pursuant to the invention, each tab 65 is sandwiched between the armature plate 40 and the associated mounting arm 42 as shown most clearly in FIG. 4. Preferably, a flange or lug 67 is formed integrally with and projects axially from the free end of each mounting arm 42 and engages the tab 65. By virtue of the lug 67, the remainder of the mounting arm is held in axially spaced relation with the armature plate 40.

When the coil 20 is de-energized and the clutch 10 is disengaged, the springs 50 acting between the armature plate 40 and the mounting arms 42 cause the tabs 65 on the springs to be pressed against the lugs 67 on the arms. Because the tabs are made of high reluctance material, they magnetically isolate the armature plate from the mounting arms. Thus, when the coil 20 is energized, flux is forced to travel along the path 46 since the tabs create a barrier against the flux straying into the mounting arms 42 and the hub 37. As a result, a higher percentage of the total flux is available to pull the armature plate across the air gap 45 and into engagement with the rotor 22. Since the flux barrier is created by the tabs 65 on the springs 50 themselves, the expense of providing separate flux isolators is completely avoided.

Figure 6:
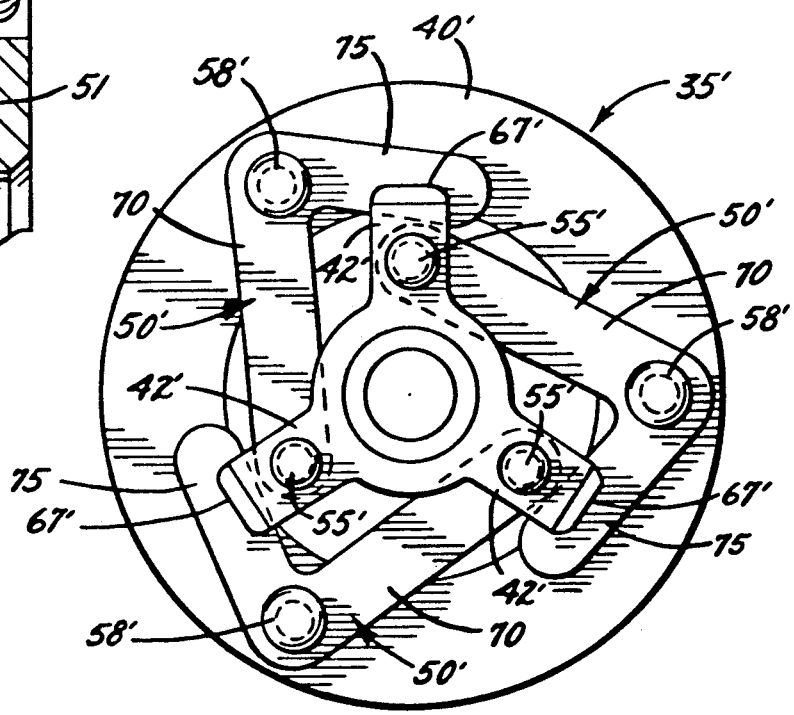
FIG. 6 is a view similar to FIG. 3 but shows another embodiment of an armature assembly constructed in accordance with the invention.

Another embodiment of an armature assembly 35' incorporating the features of the invention is shown in FIG. 6 in which parts corresponding to those of the first embodiment are indicated by the same but primed reference numerals. In this instance, the leaf springs 50' are of a more conventional nature in that each includes a straight portion 70 which is attached to a mounting arm 42' by a rivet 55' and to the armature plate 40' by a rivet 58'.

Formed integrally with and extending at an angle to the straight portion 70 of each spring 50' is an elongated finger 75. By virtue of the finger 75, each overall spring 50' is generally L-shaped with the rivet 58' being located at the corner of the L.

Each finger 75 is sandwiched between the armature plate 40' and a lug 67' on a mounting arm 42' which is adjacent to the mounting arm that supports the rivet 55' for the straight portion 70' of the respective spring 50'. As a result of the high reluctance fingers 75 being interposed between the armature plate 40' and the lugs 67', a flux barrier is established between the armature plate and the mounting arms 42'.

I claim:

1. An armature assembly for an electromagnetic coupling having means for creating magnetic flux, said armature assembly comprising a generally circular armature plate made of a material having low magnetic reluctance adapted to carry magnetic flux, a hub having an armature plate mounting area with a portion disposed in axially opposing and radially overlapping relation with said armature plate, and spring means securing said armature plate to said mounting area and connecting said armature plate and said hub for rotation in unison while supporting said armature plate for movement axially toward and away from said mounting area, said spring means comprising a series of angularly spaced leaf spring sections each having a first portion connected to said armature plate and having a second portion connected to said mounting area, said spring sections being biased to urge said armature plate axially toward said mounting area to a normal position and flexing to permit said armature plate to move axially away from said mounting area, said spring sections being made of a material having high magnetic reluctance, and each of said spring sections having an integral element located in a generally radially extending plane and sandwiched between and contacting said armature plate and said portion of said mounting area when said armature plate is in said normal position thereby to isolate said mounting area from magnetic flux in said armature plate.

2. An armature assembly as defined in claim 1 in which each of said integral elements comprises a tab formed integrally with the respective spring section, said tabs contacting said armature plate and said portion of said mounting area when said armature plate is in said normal position.

3. An armature assembly as defined in claim 2 in which each of said spring sections is generally circular, there being at least three of said spring sections spaced angularly from one another, a large axially extending opening formed through each of said spring sections, said tabs projecting radially inwardly from said spring sections and into said openings.

4. An armature assembly as defined in claim 3 in which said mounting area comprises a spider having three angularly spaced and radially extending arms aligned angularly with said spring sections, and said portion of said mounting area comprising means formed integrally with and projecting axially from the free end of each arm and contacting the respective tab when said armature plate is in said normal position.

5. An armature assembly as defined in claim 4 in which each tab extends radially outwardly from the respective arm.

6. An armature assembly as defined in claim 5 in which said first and second portions of each spring section are connected to the armature plate and the associated arm, respectively, at points lying along a line extending radially along the center of the arm and the associated tab.

7. An armature assembly as defined in claim 1 in which each of said spring sections includes a substantially straight portion, each of said integral elements comprising a finger formed integrally with and extending at an angle relative to the straight portion of the respective spring section.

8. An armature assembly as defined in claim 7 in which the straight portion and the finger of each of said spring sections define a substantially L-shaped configuration.

9. An armature assembly as defined in claim 7 in which there are at least three of said spring sections spaced angularly from one another, said mounting area comprising three angularly spaced and radially extending arms, the straight portion of each spring section being connected to one of said arms, and the finger of such spring section being sandwiched between an adjacent one of said arms and said armature plate.

10. An armature assembly as defined in claim 9 in which said portion of said mounting area comprises means formed integrally with and projecting axially from the free ends of said arms and contacting said fingers when said armature plate is in said normal position.

11. An armature assembly as defined in claim 8 in which said first portion of each spring section is connected to said armature plate at the corner of the straight portion of such spring section with the finger thereof.

12. An armature assembly for an electromagnetic coupling having means for creating magnetic flux, said armature assembly comprising a generally circular plate made of a material having low magnetic reluctance capable of carrying magnetic flux, a hub having three angularly spaced and radially extending mounting arms disposed in axially opposing relation with said armature plate, spring means securing said armature plate to said arm and connecting said armature plate and said hub for rotation in unison while supporting said armature plate for movement axially toward and away from said arms, said spring means comprising a series of three angularly spaced and generally circular leaf spring sections each having a first portion connected to said armature plate and a second portion connected to one of said mounting arms, said spring sections being biased to urge said armature plate axially toward said mounting arms to a normal position and flexing to permit said armature plate to move axially away from said mounting arms, a large opening formed axially through each spring section between said first and second portions thereof, said spring sections being made of a material having high magnetic reluctance, and a tab formed integrally with each spring section and projecting generally radially into the opening thereof, said tabs being sandwiched between said armature plate and said mounting arms to hold said armature plate out of contact with said mounting arms when said armature plate is in said normal position and thereby establish a flux barrier between said armature plate and said mounting arms.

13. An armature assembly as defined in claim 12 further including means formed integrally with and projecting axially from the free end of each mounting arm and engaging the respective tab when said armature plate is in said normal position.

14. An armature assembly as defined in claim 12 in which each tab extends radially outwardly from the respective mounting arm.

15. An armature assembly as defined in claim 14 in which said first and second portions of each spring section are connected to the armature plate and the associated arm, respectively, at points lying along a line extending radially along the center of the arm and the associated tab.

16. An armature assembly for an electromagnetic coupling having means for creating magnetic flux, said armature assembly comprising a generally circular armature plate made of a material having low magnetic reluctance capable of carrying magnetic flux, a hub having three angularly spaced and radially extending mounting arms with portions disposed in axially opposing and radially overlapping relation with said armature plate, spring means securing said armature plate to said arms and connecting said armature plate and said hub for rotation in unison while supporting said armature plate for movement axially toward and away from said arms, said spring means comprising a series of three angularly spaced leaf springs each having a substantially straight section with a first end portion connected to said armature plate and with a second end portion connected to one of said mounting arms, said springs being biased to urge said armature plate axially toward said mounting arms to a normal position and flexing to permit said armature plate to move axially away from said mounting arms, said springs being made of a material having high magnetic reluctance, and a finger formed integrally with and extending at an angle relative to the straight section of each spring, said fingers being sandwiched between said armature plate and said portions of said mounting arms to hold said armature plate out of contact with said mounting arms when said armature plate is in said normal position and thereby establish a flux barrier between said armature plate and said mounting arms.

* * * * *